(No Model.)
A. JANZON.
MIRROR ATTACHMENT FOR TELESCOPIC GLASSES.
No. 400,571. Patented Apr. 2, 1889.
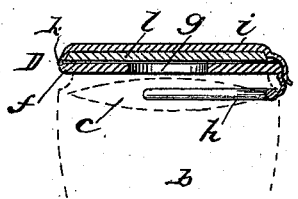
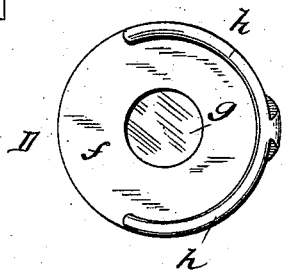
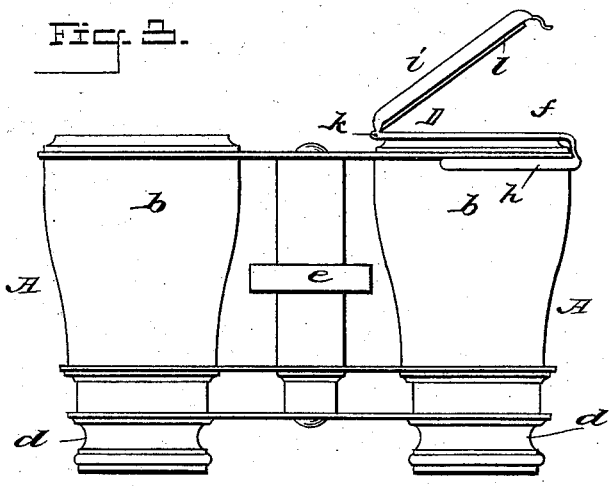
WITNESSES:
C. Sedgwick
J. M. Ritter
INVENTOR:
A. Janzon
BY Munn & Co.
ATTORNEYS.

United States Patent Office.

AUGUST JANZON, OF IRON MOUNTAIN, MICHIGAN.

MIRROR ATTACHMENT FOR TELESCOPIC GLASSES.

SPECIFICATION forming part of Letters Patent No. 400,571, dated April 2, 1889.

Application filed October 19, 1888. Serial No. 288,557. (No model.)

*To all whom it may concern:*

Be it known that I, AUGUST JANZON, of Iron Mountain, in the county of Menominee and State of Michigan, have invented a new and Improved Mirror Attachment for Telescopic Glasses or Appliances, of which the following is a full, clear, and exact description.

This invention, while applicable to spy-glasses or telescopes generally, including those which are designed for one eye only, will here be shown applied to and is more particularly intended to be used in connection with binocular telescopic glasses—such as the well-known "field-glass" or "opera-glass."

The invention consists in a readily applied and adjustable reflector or mirror attachment for the telescope in front of the object-lens thereof to provide for the person using the glass seeing, without changing his position, persons or objects at his side or in rear of him.

Reference is to be had to the accompanying drawings, forming a part of this specification, in which similar letters of reference indicate corresponding parts in all the figures.

Figure 1 represents a transverse sectional view of the reflector or mirror attachment, also showing by dotted lines the outer end, in part, of the telescope and its object-lens to which the reflector is applied. Fig. 2 is a face or inner view of said reflector attachment; and Fig. 3 is a plan or longitudinal view of a binocular glass comprising a pair of simultaneously-adjustable telescopes, as in the ordinary opera-glass in use, which it represents, with the reflector or mirror attachment embodying my invention applied to one of the telescopes.

A A indicate the two connected telescopes of an ordinary opera-glass, $b\ b$ being the outer tubes or cases thereof, each of which contains an object-lens, $c$, and $d\ d$ being the inner tubes containing the usual eye-lenses, and on or along which the outer tubes, $b\ b$, are adjustable in or out by suitably turning a thumb and finger piece or nut, $e$, attached to a central screw or other adjusting means controlling both telescopes, as usual.

The reflector or mirror attachment D consists of a circular or other suitably-shaped metal or other plate, $f$, having a central contracted aperture, $g$, and a double jaw-like spring clamp or clip, $h\ h$, also a cover, $i$, hinged, as at $k$, to the one side of the plate $f$ and containing a mirror, $l$. This reflector or mirror attachment is readily applied, when required, to the outer end of either telescope or outer tube, $b$, directly over or contiguous to the object-lens $c$, and so that the aperture $g$ will be concentric therewith, by simply sliding the plate $f$ over the outer end of the tube $b$ of the telescope and springing the jaws of the clamp or clip $h\ h$, which are suitably shaped for the purpose, over or partly around the outer end portion of the tube $b$. The mirror $l$, or cover $i$, containing the same, is then opened or adjusted by its hinge to any desired acute angle with the object-lens $c$, when the person using the opera-glass will be enabled to easily get a view of persons or objects at the side or in the rear of him without his changing the position to the same direction. This will be found a great convenience to persons attending theaters, concert-rooms, or other public places of amusement or instruction. Said reflector or mirror attachment operates by reflecting the rays of light which emanate from objects at the side or in the rear of the observer, and as applied to a telescope, which is adjustable for different visions, the same will be found a very useful adjunct. To prevent disturbance of light-rays emanating from the front, the opening $g$ in the plate $f$ is smaller than the object-lens $c$ of the opera-glass. The device, too, being detachable at pleasure and of a shape and size to be easily carried in a small pocket, may, when not attached to the telescope or opera-glass, be used as a handy or convenient mirror for ordinary purposes, and it may be slipped to its place upon the telescope, when required, almost without observation by others.

Having thus fully described my invention, I claim as new and desire to secure by Letters Patent—

1. A reflector or mirror attachment for telescopes, including opera-glasses, consisting of a metal or other suitable plate having a central contracted aperture, a clamp attached to said plate adapted to hold the latter upon the outer end of the telescope, with its contracted aperture in concentric position over or on the outside of the object-lens of the telescope, and a mirror hinged to the one side of said plate for operation, substantially as specified.

2. In a reflector or mirror attachment for telescopes, including opera-glasses, the removable reflector or mirror attachment D, composed of a metal or other suitable plate, $f$, adapted to close the outer end of the telescope, and provided with a central aperture, $g$, an elastic clamp or clip, $h\ h$, attached to said plate and adapted to hug the outer tube or case of the telescope, and a reflector or mirror-provided cover hinged to the one side of said plate, essentially as shown and described.

AUGUST JANZON.

Witnesses:
JOHN JAMES,
FRANK E. CROCKER.